United States Patent [19]

Marchbanks

[11] Patent Number: 4,586,890

[45] Date of Patent: May 6, 1986

[54] CAULK BEAD TOOL

[76] Inventor: Clandes Marchbanks, 7800 E. Jefferson, Apt. 1234, Detroit, Mich. 48214

[21] Appl. No.: 726,840

[22] Filed: Apr. 24, 1985

[51] Int. Cl.⁴ ........................ B29C 33/40; B29C 67/00

[52] U.S. Cl. .................................... 425/458; 15/105.5; 15/235.3; 425/DIG. 44

[58] Field of Search ............. 15/105.5, 105.51, 105.52, 15/105.53, 235.3; 425/458, DIG. 44

[56] References Cited

U.S. PATENT DOCUMENTS

| | | | |
|---|---|---|---|
| 2,247,603 | 7/1941 | Christman | 425/458 |
| 2,817,875 | 12/1957 | Harris et al. | 425/DIG. 44 |
| 2,859,473 | 11/1958 | Warren | 425/458 |
| 2,902,713 | 9/1959 | Buelow | 425/458 |
| 2,914,798 | 12/1959 | Lausman | 425/458 |

*Primary Examiner*—Willard E. Hoag

*Attorney, Agent, or Firm*—F. B. McDonald

[57] ABSTRACT

A first end of a hand held elongated flexible tool is used for uniformly compressing and contouring of a bead of caulk, grout, putty, or other fluent material. The opposite end of the tool is then used to remove excess fluent material from the sides of the contoured bead. In a preferred form, the contouring end of the tool contains at least one concavity extending longitudinally from an extremity of that end and partially along one side of the tool. A bead is contoured by one stroke or pass of the tool, and in one preferred embodiment the contouring end contains two such concavities on opposite sides. In the same embodiment, one concavity has a greater lateral dimension than the other for providing two choices of bead width. The opposite end of the tool is disposed for removal of excess fluent material, and has a concavity extending fully laterally across the extremity of that end. The later concavity is used to bridge the finished caulk bead, wherein a planar side adjacent the later concavity is utilized to wipe away excess material from the sides of the finished or contoured bead.

10 Claims, 2 Drawing Figures

CAULK BEAD TOOL

BACKGROUND OF THE INVENTION

This invention relates generally to tools utilized for contouring and finishing beads of caulk, grout, putty, and other fluent materials (hereinafter sometimes referred to only as "caulk"). More particularly, the invention relates to apparatus for compressing and contouring beads of fluent material freshly applied to joints, and for removal of excess fluent material from the sides of the joints after finished or contoured beads have been obtained.

Many tools are available in the prior art for contouring and finishing beads of caulk and other fluent materials applied to intersecting planar surfaces. Some of such tools teach a one-step application and contouring of a bead of fluent material within a joint, but are devoid of any teaching or recognition of potential clean-up problems along the sides of an applied and contoured bead. A few of such tools disclosed purport to be able to avoid excess distribution of fluent materials along the sides of a bead in the first instance. However, to the extent that they may not always satisfactorily perform in the manner suggested, the tools disclosed are inadequate to remove such excess fluent material.

Moreover, most of the tools are constructed in a rather complex manner, either by virtue of complicated physical manufacturing requirements, or wherein several parts are required for assembly of the tool. In addition, to the extent that resilience and flexibility of the applied tool surfaces are deemed highly desirable for creation of a superior appearance for the finished bead in the opinion of the present inventor, most of the prior art tools appear to lack adequate resilience and flexibility.

SUMMARY OF THE INVENTION

The resilient and flexible tool of the present invention provides a unitary, elongated one-piece member adapted for uniformly compressing and contouring a bead of caulk, and also for removing excess caulk from the sides of the contoured bead.

In a preferred form the tool is made of an elastomer material, and at a first end, hereinafter called the contouring end, includes at least one concavity extending longitudinally from that end and partially along one side of the tool. The concavity is disposed for contouring a bead of caulk upon a single pass or stroke of the tool over the length of the bead. In a presently preferred embodiment the contouring end of the tool includes two such concavities on opposing sides of the tool, one concavity having a greater lateral dimension than the other for providing two choices of bead width.

The opposite and second end of the tool includes a concavity extending fully laterally across the extremity of that end. The second end is disposed for removal of excess caulk material from the joint surfaces along the sides of the applied bead, wherein the laterally extending concavity bridges the applied bead, and a flat surface adjacent the lateral concavity is utilized to wipe away excess material from the joint sides.

DETAILED DESCRIPTION OF A PREFERRED EMBODIMENT

Figure 1:
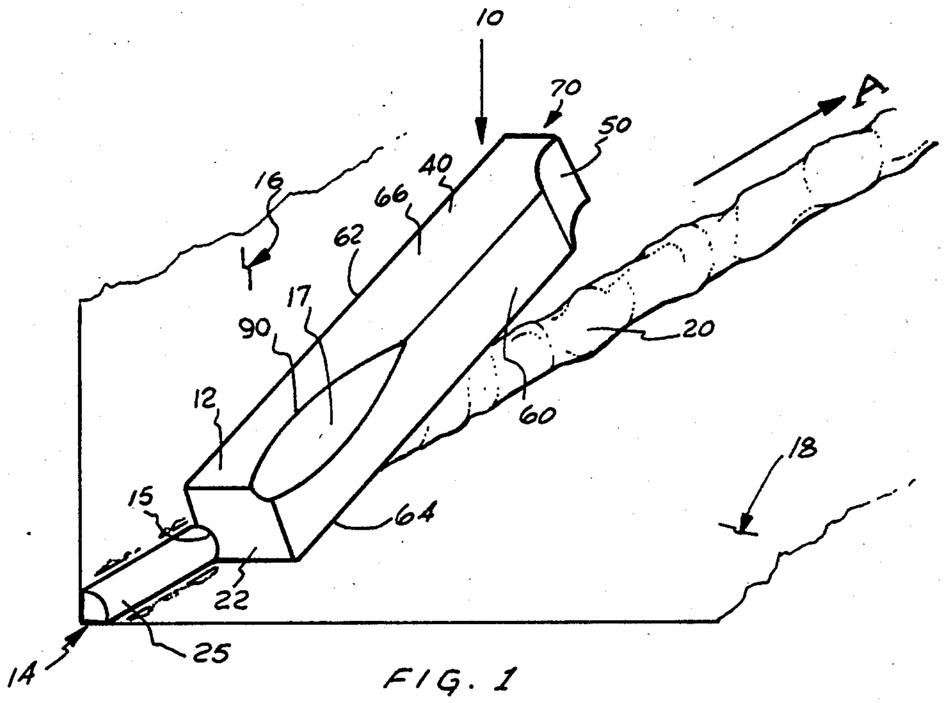
FIG. 1 is a perspective view of a preferred embodiment of the tool of the present invention, shown with its contouring end applied against a bead of caulk freshly dispensed in a joint.

Referring initially to FIG. 1, a preferred embodiment of a caulk bead tool 10 is shown with its contouring end 12 being stroked in the direction "A" along a freshly dispensed bead of caulk 20. The tool is physically supported against an intersecting pair of planar surfaces 16 and 18 which form a joint 14 into which the bead 20 has been dispensed.

In the presently preferred embodiment, the tool 10 includes at least one contouring concavity 15 which extends longitudinally from an axial extremity 22 of the contouring end 12 at least partially along one edge of the tool, that edge in the present case located at the intersection of orthogonally adjacent planar sides 62 and 64. The elongated body of the tool 10 is formed of a resilient, compressible material, and in the present case is of an elastomer. Under a slight pressure against the joint 14, the tool will flex, and the portion of the sides 62 and 64 along the contouring end 12 will lay flat against the respective planar surfaces 16 and 18 of the joint 14. As the tool is drawn along the bead 20 the sides 62 and 64 will scour the bead along the edges thereof to present a finished bead 25 as shown in FIG. 1. For this purpose, the tool is held at a slight acute angle in the direction of the stroke as shown, which in the present case is a direction depicted by the arrow "A".

In the presently preferred embodiment, an alternate contouring concavity 17 is disposed oppositely or 180° apart from the first contouring concavity 15. In the present embodiment, the concavity 15 has a greater overall lateral dimension than the concavity 17 for the purpose of providing two choices of bead width. Each of the longitudinally extending concavities 15 and 17 expands laterally outwardly and has its greatest latitude at its approximate midpoint. Each also has its greatest surface depth in the same region. The later midpoint regions are shown generally at 80 in the case of the first concavity 15 (see FIG. 2), and 90 in the case of the alternate concavity 17 (see FIG. 1). The later regions provide relief zones for alleviating an undesirable crowding and packing of fluent material along and within the concavities during the contouring strokes of the tool. Such relief zones were found to provide an optimal surface finish on a contoured bead.

In the preferred form, each of the concavities 15 and 17 extend symmetrically between the adjoining planar surfaces of the tool; in the case of concavity 15 the surfaces 62 and 64 having been noted, wherein in the case of concavity 17, the adjoining orthogonal surfaces are 66 and 60 respectively. Each of the sides, 60, 62, 64, and 66 is preferably planar and has dimensions generally equal to each of the others. Oppositely disposed pairs of sides, 60–62 and 64–66, are parallel in the presently preferred embodiment. The axial extremities of the tool 22 and 70 also define planar surfaces, generally disposed orthogonally to each of the lateral sides 60, 62, 64, and 66.

Figure 2:
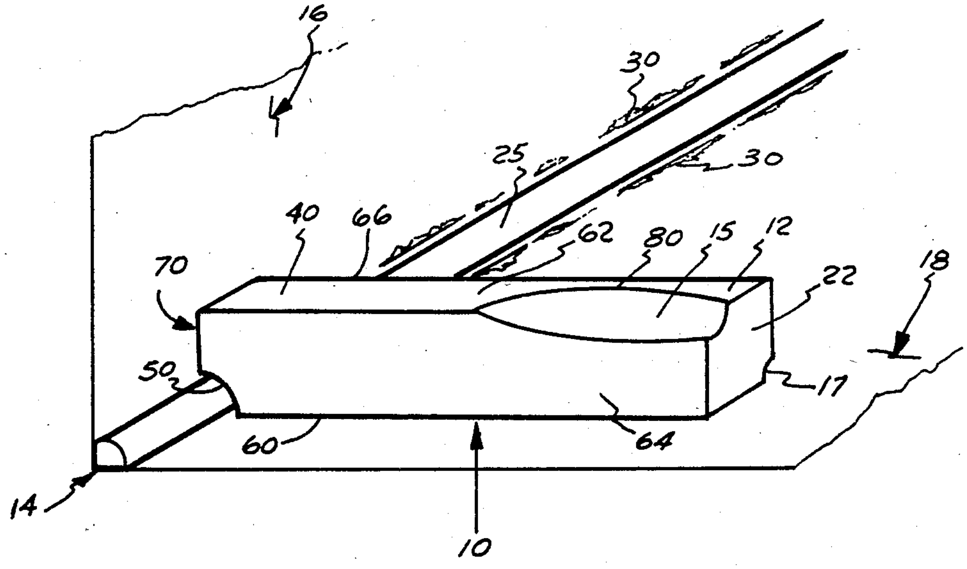
FIG. 2 is a perspective view of the same tool shown with its removal end applied against the same joint.

Referring now to FIG. 2, a removal end 40 of the tool includes a laterally extending concavity 50 which extends fully between parallel sides 64 and 66. The lateral concavity 50 is preferably situated symmetrically between the orthogonal planar surfaces presented by the side 60 and the axial extremity 70. The concavity 50 is disposed for bridging a finished or contoured bead 25 (as shown in FIG. 2) for the purpose of causing the planar lateral side 60 to be applied against the planar joint surfaces 16 and 18, each in turn, for removing excess fluent material 30 from the sides of the finished bead 25. As shown in FIG. 2, the planar surface 60 is being moved across the planar surface 18 in the direction "A". The planar surface presented by the axial extremity 70 of the removal end of the tool operates to support the tool against the surface 16 for effective removal of the excess material without damage to the finished bead 25. For removal of the excess material 30 from the adjoining planar surface 16, the lateral side 60 of the tool must be applied against the surface 16 and moved in the direction "A", the planar surface of extremity 70 then being applied against the surface 18 for support of the tool, as will be appreciated by those skilled in the art.

Finally, it should be noted that for optimal utilization of the tool, the present inventor has found that each end of the tool should first be wetted (water is sufficient) immediately prior to application of the tool. In addition, the presently preferred lengths of the contouring concavities 15 and 17 are equal to approximately one third the overall axial length of the tool 10. In the presently preferred form, the tool is hand held, and is approximately four inches in length.

Although only one presently preferred embodiment has been shown and described herein, numerous additional embodiments are envisioned to fall within the scope and spirit of the following claims.

What is claimed is:

1. A tool disposed for being supported by and drawn along a joint formed by a pair of intersecting planar surfaces for finishing a bead of caulk freshly applied to said joint, said tool comprising a unitary, flexible, elongated body, said body formed of a resilient, compressible material containing first and second axially spaced operative ends; said first end defining means for contouring said bead of caulk, said means comprising a first concavity extending longitudinally along said elongated body from an axial extremity of said first end at least partially along one side thereof, and said second end defining means for removal of the excess caulk from said intersecting planar surfaces comprising a second concavity extending fully laterally across an axial extremity of said second end of said tool.

2. The tool of claim 1 wherein said body defines four planar sides, each side having generally equal dimensions, with oppositely disposed pairs of said sides being parallel.

3. The tool of claim 2 wherein said first concavity extends symmetrically between two adjacent planar sides at said first end of said tool.

4. The tool of claim 3 wherein said first end of said tool also comprises an opposed alternate contouring concavity, said alternate contouring concavity extending longitudinally along said tool 180° apart from said first contouring concavity, and parallel to said first concavity.

5. The tool of claim 4 wherein said alternate contouring concavity defines a greater depth and a greater latitude than said first concavity.

6. The tool of claim 5 wherein said first and alternate contouring concavities comprise latitudes which increase to a maximum dimension at their proximal midpoints.

7. The tool of claim 6 wherein said first and alternate contouring concavities comprise depths which increase to a maximum dimension at their proximal midpoints.

8. The tool of claim 7 wherein said second concavity extending laterally across said second end of said tool is disposed for bridging a caulk bead contoured by one of said first or alternate contouring concavities at said first end of said tool.

9. The tool of claim 8 wherein the lengths of said first and alternate contouring concavities comprise approximately one third the overall axial tool dimension.

10. The tool of claim 9 wherein said resilient, compressible material comprises an elastomer.

* * * * *